United States Patent [19]

Young

[11] Patent Number: 5,013,114

[45] Date of Patent: May 7, 1991

[54] OPTICAL SWITCH APPARATUS

[75] Inventor: Terence P. Young, Clemsford, United Kingdom

[73] Assignee: The General Electric Company, p.l.c., London, United Kingdom

[21] Appl. No.: 374,924

[22] Filed: Jul. 3, 1989

Related U.S. Application Data

[63] Continuation of Ser. No. 78,940, Jul. 29, 1987, abandoned.

[30] Foreign Application Priority Data

Jul. 30, 1986 [GB] United Kingdom ............... 8618545

[51] Int. Cl.$^5$ .............................................. G02B 6/10
[52] U.S. Cl. ............................... 350/96.14; 350/96.13
[58] Field of Search ............... 350/96.11, 96.12, 96.13, 350/96.14, 96.15

[56] References Cited

U.S. PATENT DOCUMENTS

| | | | |
|---|---|---|---|
| 4,160,579 | 7/1979 | Milton | 350/96.14 |
| 4,372,643 | 2/1983 | Liu et al. | 350/96.14 |
| 4,645,293 | 2/1987 | Yoshida et al. | 350/96.14 |
| 4,679,893 | 7/1987 | Ramer | 350/96.14 |

OTHER PUBLICATIONS

Richard A. Forber et al., "Symmetrical Directional Coupler Switches", IEEE Journal of Quantum Electronics, vol. QE-22, No. 6, (Jun., 1986), pp. 911-918.

Primary Examiner—Frank Gonzalez

[57] ABSTRACT

An optical switch apparatus comprises two optical waveguides, which may be formed by diffusing titanium into a lithium niobate body. Electrode are bonded to the surface of the body and are arranged such that an electric field may be applied across the body, resulting in the distance between the waveguides being reduced. Hence a change is produced in the coupling constant of the waveguides and the switching response of the switch may be enhanced.

21 Claims, 2 Drawing Sheets

OPTICAL SWITCH APPARATUS

This application is a continuation, of application Ser. No. 07/078,940 filed Jul. 29th, 1987 now abandoned.

BACKGROUND OF THE INVENTION

This invention relates to an optical switch apparatus.

It is often required to switch light from one port to another. For example, in the field of telecommunications, data may be carried as optical data in an optical beam, and in order to process the optical data, it is often necessary to switch the optical beam from one waveguide to another.

Optical switches are known in which light is transferred from one waveguide to another, not by means of a mechanically moveable member, but by causing light to couple directly from one waveguide to the other through the walls of the waveguide over a distance known as the coupling length. In a known example of an optical switch apparatus of this kind, the waveguides take the form of elongate channels having a predetermined refractive index which are formed in or on a body of lower refractive index. When light enters the first waveguide, some of the light is coupled from the first waveguide to the second waveguide and emerges from the second waveguide. Thus there is some degree of optical coupling between the two waveguides. However, it is often desired either to have all the light which entered the first waveguide emerge from the first waveguide, this condition being known as the "through state" of the switch, or to cause all the light which entered the first waveguide to be coupled to the second waveguide and emerge from the second waveguide, this being known as the "cross state" of the switch. Application of a suitable electric field to the body modifies the degree of optical coupling which occurs between the two channels by altering the refractive index of the channels due to the electro-optic effect. By correctly choosing the electric field in relation to the optical properties of the switch, light is caused to largely transfer from one channel to the other. The transfer of light is, however, not complete and both the through state and the cross state are difficult to achieve in a reliable manner as a number of difficult design constraints have to be satisfied.

SUMMARY OF THE INVENTION

The present invention seeks to provide an improved optical switch apparatus.

According to a first aspect of the invention there is provided an optical switch apparatus comprising a body having first and second light transmissive regions of refractive indices which are higher than the refractive index of the said body, the second region being spaced apart from the first region, and each region having associated therewith two electrode means separated by a small gap positioned at a central position of each region, the width of each gap being substantially smaller than the distance between the two gaps whereby generation of an electric field across said gaps produces a marked localised variation in refractive index under each gap so as to produce maxima and minima values of refractive index within each region. This variation in refractive index may be such as to substantially alter the degree of optical coupling between the first and second regions, and thus enable switching to be implemented.

The ratio of the width of the gap to the spacing between the gaps is advantageously smaller than 1 to 4, whereby application of a potential difference of less than 50 volts across each gap substantially alters the degree of optical coupling between the first and second regions, and preferably the ratio is 1 to 5.

The degree of optical coupling in an optical switch is altered by applying an electric field across the waveguides such that the refractive index in each waveguide is altered due to the electro optic effect.

In known optical switches, an electric field is applied across the waveguides such that the refractive index in the first waveguide increases and the refractive index in the second waveguide decreases, and the degree of coupling will vary as a function of the difference between the refractive index in the first waveguide and the refractive index in the second waveguide.

The degree of coupling may also be altered by altering the coupling coefficient directly, i.e. the coupling per unit length, associated with the two waveguides. The coupling coefficient is dependent upon the separation of the first and second paths along which light may be transmitted within the first and second waveguides.

The present invention alters the degree of optical coupling between two waveguides by altering the positions of the paths along which light may propagate within the waveguides by the application of very low voltage differences of the order of 30 volts, rather than by altering the optical properties of each waveguide and leaving the positions of the first and second paths unaltered.

The path along which light may propagate within a waveguide is known as the optical path.

Preferably the body having the first and second regions is made from lithium niobate, and the regions are formed by diffusing titanium into surface regions of the lithium niobate. The areas into which the titanium has diffused are caused by the presence of the titanium to have a higher refractive index than the surrounding lithium niobate, and hence are capable of acting as optical waveguides.

Preferably also, the electrode means are flat electrodes positioned at the surface of the body, and there may be an electrode which is common to the two electrode means. The electrodes are preferably not bonded directly to the surface, but to a buffer layer which separates the electrodes from the surface of the body.

The electrodes may be made of any conducting material, but gold is preferred, and the buffer layer may be made from silicon dioxide. Preferably a potential difference of less than 30 volts is applied across each gap.

BRIEF DESCRIPTION OF THE DRAWINGS

One way in which the invention may be performed is now described by way of example with reference to the accompanying drawings in which.

DESCRIPTION OF A PREFERRED EMBODIMENT

Figure 1:
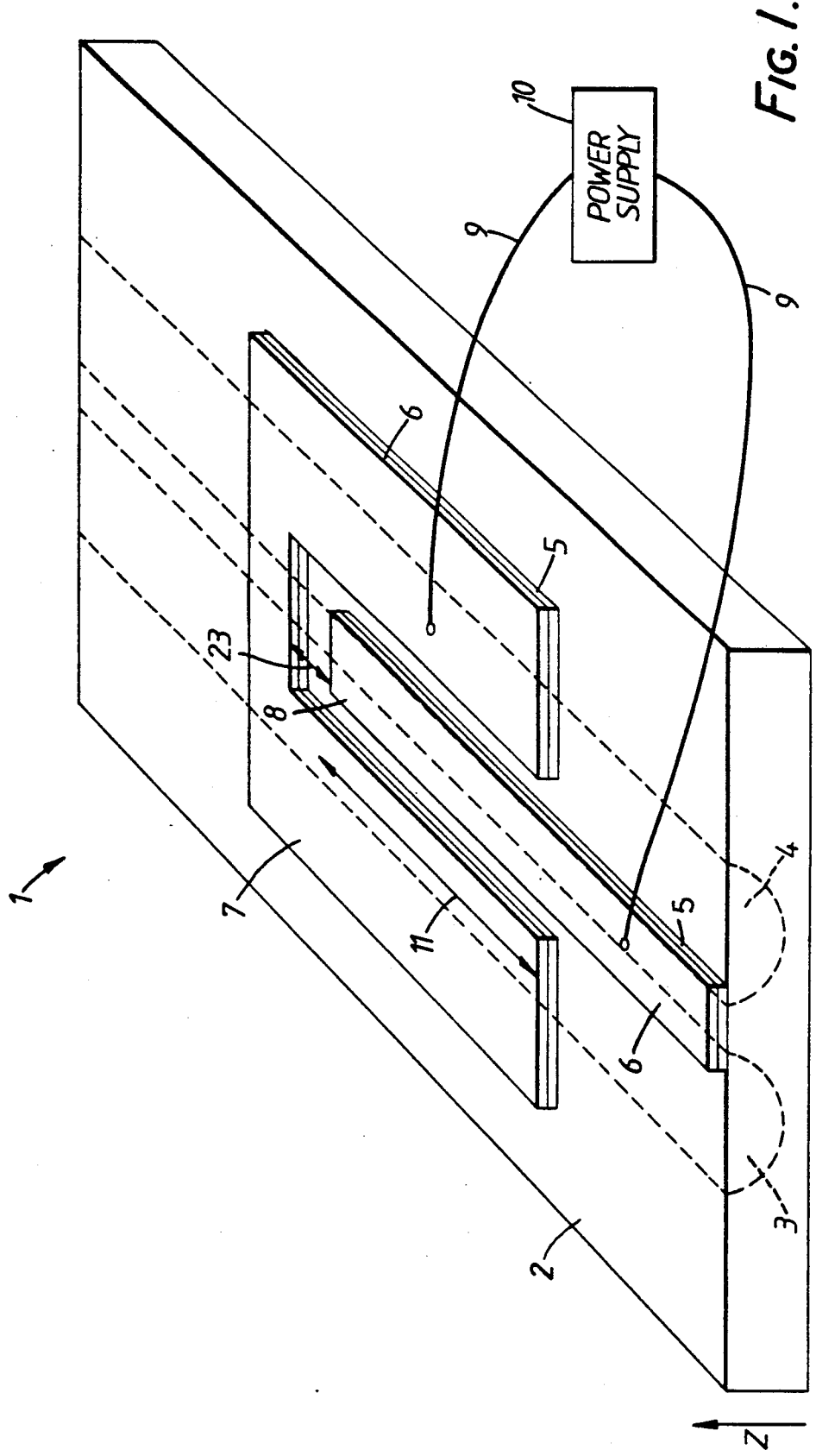
FIG. 1 is a perspective view of an optical switch in accordance with the invention.

Referring to FIG. 1, an integrated optical switch, indicated generally by reference 1, comprises a body 2 made from Z-cut lithium niobate. The surface plane of the body 2 is orthogonal to the Z-direction of the crystal structure of the lithium niobate as indicated by the arrow showing the Z-direction. Titanium is diffused into the surface to form channels 3 and 4, having a higher refractive index than the body 2, and therefore being capable of acting as optical waveguides. The channels 3 and 4 are represented by dotted lines to indicate their positions for explanatory purposes and are elongate regions arranged parallel to each other. They would not, of course, be visible under normal circumstances. Buffer layers 5, of silicon dioxide are deposited onto the surface of body 2, one layer being generally U-shaped with arms arranged parallel to the channels 3 and 4 and another layer, separate from the first, being located within the arms of the U-shaped layer as shown. Layers 6 of gold are deposited onto the buffer layers 5 of to form electrodes 7 and 8. Conductive wires 9 connect the electrodes 7 and 8 to a power supply 10.

The distance 11 represents the distance over which coupling may take place between the waveguides, and, in this embodiment is between one and two coupling lengths long, which is approximately 3 mm. Of course, in other embodiments of the invention, it may be a different length.

In the illustrated optical switch the wavelength of light guided by the channels 3 and 4, is approximately 1.3 micrometers.

Figure 2:
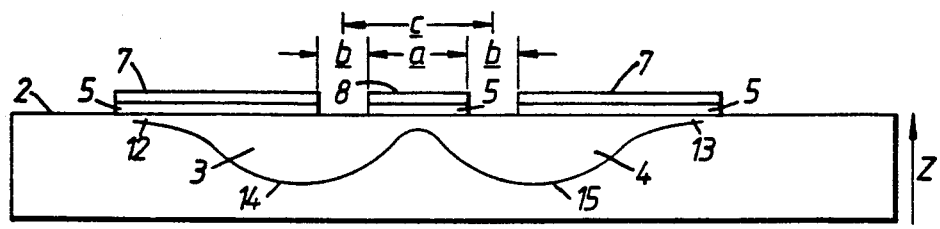
FIG. 2 is a transverse cross-section of the switch of FIG. 1 illustrating the positions of the waveguides when no electric field is applied.

FIG. 2, is a transverse cross section of the optical switch 1 and shows the positions of the channels 3 and 4 when no electric field is applied. The channels 3 and 4 are not completely separate from each other and both of them have edges which tail off gradually at 12 and 13 respectively.

The width of the central electrode 8 is denoted by the reference letter a, and the size of each gap between the electrodes 7 and 8, is denoted by the reference letter b. The distance denoted by the reference letter c, which extends between the centres of the gaps is the spacing between the gaps.

Because the channels are formed by the diffusion of titanium into lithium niobate, there is some titanium in the body 2, outside the areas indicated by 3 and 4. As the titanium is diffused through the body 2 the concentration of titanium decreases as a function of the distance from the surface of the body 2.

The lines 14 and 15 represent the positions of the channels 3 and 4 and indicate the areas within which the concentration of titanium is sufficiently high to result in those areas being capable of acting as optical waveguides when no electric field is applied. The areas of the body beyond lines 14, 15, contain titanium in concentrations which decrease with distance from the boundaries 14 and 15. The positions of the channel 3 relative to the other channel 4 is arranged such that the distance between the optical paths of channel 3 and channel 4 results in there being some degree of coupling between them over the length of the device. Approximately half the light entering channel 3 emerges from channel 4, and the remainder continues along channel 3, i.e. neither the cross state nor the through state is achieved when no electric field is applied.

Figure 2A:
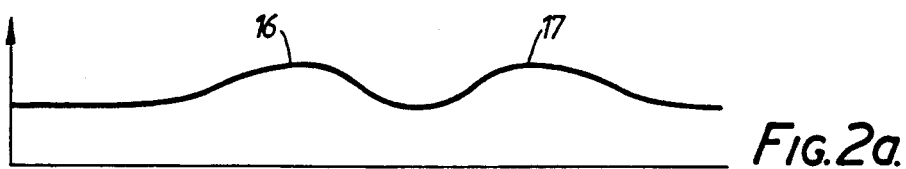
FIG. 2a shows the variation in refractive index across the switch when no electric field is applied.

FIG. 2a illustrates the variation in refractive index across the switch when no electric field is applied. The areas of high refractive index 16 and 17 correspond to the channels 3 and 4, capable of acting as optical waveguides.

The refractive index of a material may be altered by applying an electric field across the material. Depending on the polarity of the field applied, the refractive index of a material may be increased or decreased.

Figure 3:
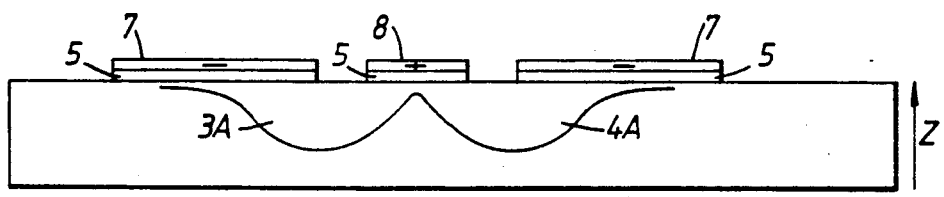
FIG. 3 is a transverse section of the switch of FIG. 1 illustrating the positions of the waveguides when an electric field is applied.

FIG. 3 illustrates the switch 1 when an electric field is applied as shown across the switch 1 by means of electrodes 7 and 8. The effect of applying this field is to decrease the refractive index of material subject to a negative electric field and to increase the refractive index of the material subject to a positive electric field in a way which is proportional to the strength of the field.

Due to the ratio of the gap width b to the gap separation c, which is preferably around 1 to 5, when an electric field is applied as shown in FIG. 3, a marked localised variation in refractive index is produced under the gaps between the electrodes 7 and 8. Therefore, the refractive index of part of the area which, when no field is applied, is capable of acting as an optical waveguide will decrease, and the refractive index of the rest of the said area will increase. The areas under the gaps are subject to a steep refractive index gradient, represented by slopes 18, 19 in FIG. 3a which illustrates the refractive index across the switch.

Figure 3A:
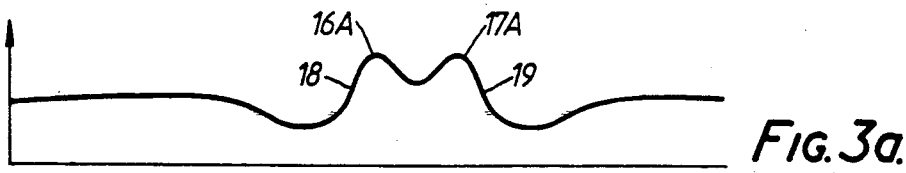
FIG. 3a shows the variation in refractive index across the switch when the electric field of FIG. 3 is applied.

In FIG. 3a, it can be seen that areas 16A and 17A, of high refractive index correspond to areas 3A and 4A, and represent the positions of the areas capable of acting as optical waveguides. The areas 16A and 17A of higher refractive index, corresponding to areas 3A, 4A are much closer together than corresponding areas 16 and 17 and 3 and 4 of FIG. 2a and 2 respectively, and the coupling coefficient is sufficiently increased to allow the switch to operate in the cross state.

Figure 4:
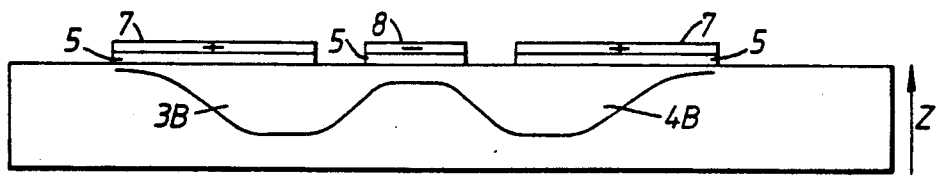
FIG. 4 is a transverse section of the switch of FIG. 1 illustrating the positions of the waveguides when an electric field of opposite polarity to that of FIG. 3 is applied.

FIG. 4 illustrates the switch 1 in transverse section when an electric field is applied across the switch 1 as shown by means of electrodes 7 and 8. The field has the opposite sense to that applied to the switch as illustrated in FIG. 3.

Figure 4A:
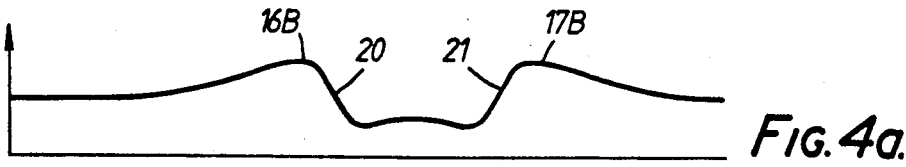
FIG. 4a shows the variation in refractive index across the switch when the electric field of FIG. 4 is applied.

Referring to FIG. 4a which again illustrates the refractive index, it can be seen that the regions of the areas which are capable of acting as optical waveguides which are under the gaps between the electrodes 7 and 8, are subject to steep refractive index gradients represented by slopes 20 and 21.

The areas of higher refractive index 16B and 17B, corresponding to areas 3B and 4B in FIG. 4, are therefore closer together than areas 16 and 17 in FIG. 2a which correspond to areas 3 and 4, in FIG. 2.

This reduces the coupling coefficient associated with the two channels, and therefore the degree of coupling is reduced sufficiently to allow the switch to operate in the through state.

By means of an optical switch in accordance with the invention, it is possible to operate it in either the through state or the cross state by applying an appropriate electric field to the switch.

In the optical switch herein described, the distance between the electrodes 7 and 8 denoted by the reference letter b on FIG. 2, is approximately 2 micrometers and the spacing between the gaps, c, is 10 micrometers. The distance 23 between the middle electrode 8 and the cross part of the U-shaped electrode 7, as shown in FIG. 1, is approximately 0.5 mm, and so the effect of the electric field across distance 23 is negligible.

Appropriate voltages to operate the switch are approximately +30 V and approximately −30 V. When the electrode 7 is negative with respect to the electrode 8, the cross state of the switch may be achieved, and when electrode 7 is at a positive potential with respect to electrode 8, the through state of the switch may be achieved.

I claim:

1. An optical switch apparatus comprising: a body having first and second closely spaced apart light transmissive regions of higher refractive indices than said body; a first electrode having first and second spaced-apart portions, the first portion of the first electrode being positioned at least partially over the first region and the second portion of the first electrode being positioned at least partially over the second region; a second electrode disposed between the first and second portions of the first electrode and covering portions of the first and second regions, the second electrode being separated from the first portion of the first electrode by a gap and being separated from the second portion of the first electrode by another gap, wherein the first and second regions are substantially distinct from one another along the length of the electrodes, and wherein applying a potential difference between said first and second electrodes produces a localised variation in refractive index under each gap so as to alter the distance between said regions.

2. Apparatus according to claim 1 wherein the ratio of the width of each gap to the spacing between the gaps is smaller than 1 to 4, whereby application of a potential difference of less than 50 volts across each gap substantially alters the degree of optical coupling between the first and second regions.

3. Apparatus according to claim 2 in which the ratio of the width of each gap to the said spacing between the gaps is 1 to 5.

4. Apparatus according to claim 1 wherein said first and second regions are elongate surface regions capable of acting as optical waveguides, said regions being arranged substantially parallel to one another and having a coupling coefficient associated with them, and including means connected to the first and second electrodes for applying an electric field across said body such that the distance between said regions is altered, thereby causing a change in the coupling coefficient of the two waveguides so as to vary the degree of optical coupling between the first and second regions.

5. Apparatus according to claim 1 in which the body is of lithium niobate.

6. Apparatus according to claim 5 in which said first and second regions are formed by diffusing titanium into said lithium niobate.

7. Apparatus according to claim 1 in which said electrodes comprise flat electrodes positioned at the surface of the body, the first electrode being of U-shaped configuration and the second electrode being located between the arms of said U-shaped first electrode.

8. Apparatus according to claim 7 in which layers of silicon dioxide are deposited on the surface of said body to act as a buffer between said electrodes and said body.

9. Apparatus according to claim 7 in which said electrodes are of gold.

10. An optical switch apparatus, comprising:
a light-transmissive body having an index of refraction which can be changed by an electric field, the body having a surface;
material diffused into the surface of the body along first and second paths that are spaced apart and generally parallel to increase the index of refraction of the body in first and second elongated regions which are spaced apart and generally parallel;
a first elongated electrode arm above the first region and generally parallel to the first region;
a second elongated electrode arm above the second region and generally parallel to the second region, the first and second electrode arms being spaced apart;
connection means for maintaining the electrode arms at the same electrical potential; and
a further electrode between the electrode arms, the further electrode being separated from the first electrode arm by a first elongated gap and being separated from the second electrode arm by a second elongated gap.

11. The apparatus of claim 10, wherein the first and second gaps are generally parallel and have approximately the same length.

12. The apparatus of claim 11, wherein the first and second gaps have approximately the same width.

13. The apparatus of claim 12, wherein the gaps have respective centers, and wherein the distance between the centers of the gaps is more than four times the width of the gaps.

14. The apparatus of claim 13, wherein the distance between the centers of the gaps is approximately five times the width of the gaps.

15. The apparatus of claim 14, wherein the spacing between the centers of the gaps is approximately 10 micrometers, and wherein the width of the gaps is approximately two micrometers.

16. The apparatus of claim 15, further comprising an insulating layer on the surface of the block, the first electrode arm, second electrode arm, connection means, and further electrode being disposed on the insulating layer.

17. The apparatus of claim 16, wherein the first electrode arm, second electrode arm, and connection means form a generally U-shaped conductive layer.

18. The apparatus of claim 17, wherein the body comprises lithium niobate and the material diffused into the surface of the body comprises titanium.

19. The apparatus of claim 10, further comprising an insulating layer on the surface of the block, the first electrode arm, second electrode arm, connection means, and further electrode being disposed on the insulating layer.

20. The apparatus of claim 10, wherein the body comprises lithium niobate and the material diffused into the surface of the body comprises titanium.

21. The apparatus of claim 20, wherein the first and second regions are substantially straight and the first and second gaps are substantially straight.

* * * * *